United States Patent
Takano

(10) Patent No.: US 8,134,595 B2
(45) Date of Patent: Mar. 13, 2012

(54) IMAGE PROCESSING SYSTEM AND METHOD WITH HIGH RESOLUTION VIEW-POINT CONVERSION IMAGES

(75) Inventor: Teruhisa Takano, Kawasaki (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1191 days.

(21) Appl. No.: 11/755,368

(22) Filed: May 30, 2007

(65) Prior Publication Data

US 2007/0285549 A1 Dec. 13, 2007

(51) Int. Cl.
*H04N 7/18* (2006.01)
*H04N 13/02* (2006.01)
*H04N 5/225* (2006.01)
*G06K 9/00* (2006.01)

(52) U.S. Cl. ........ 348/153; 348/47; 348/218.1; 382/154
(58) Field of Classification Search .............. 348/36–39, 348/47–48, 153, 159, 218.1, 333.05, 148, 348/147; 382/154, 284, 294
See application file for complete search history.

(56) References Cited

U.S. PATENT DOCUMENTS

| 6,912,001 | B2 * | 6/2005 | Okamoto et al. | 348/222.1 |
| 7,161,616 | B1 * | 1/2007 | Okamoto et al. | 348/148 |
| 2001/0055070 | A1 * | 12/2001 | Watanabe | 348/333.05 |
| 2002/0110262 | A1 * | 8/2002 | Iida et al. | 382/104 |
| 2002/0175999 | A1 * | 11/2002 | Mutobe et al. | 348/148 |
| 2005/0024686 | A1 * | 2/2005 | Ilda et al. | 358/302 |

FOREIGN PATENT DOCUMENTS

| JP | 2002-019556 | | 1/2002 |
| JP | 2004-320567 | A | 11/2004 |
| JP | 2006-121587 | A | 11/2006 |

\* cited by examiner

*Primary Examiner* — Lin Ye
*Assistant Examiner* — Mekonnen Dagnew
(74) *Attorney, Agent, or Firm* — Young Basile

(57) ABSTRACT

An image processing system so disclosed has respective image pickup parts and respective viewpoint conversion parts configured to perform viewpoint conversion of original images captured by the respective image pickup parts to generate converted images. The image processing system also includes a display device controllable to display the converted images.

19 Claims, 16 Drawing Sheets

IMAGE PROCESSING SYSTEM AND METHOD WITH HIGH RESOLUTION VIEW-POINT CONVERSION IMAGES

CROSS-REFERENCE TO RELATED APPLICATION

This application claims priority from Japanese Patent Application Serial No. 2006-154486, filed on Jun. 2, 2006, which is incorporated herein in its entirety by reference.

TECHNICAL FIELD

The invention pertains generally to an image processing system and an image processing method wherein images captured by plural cameras carried on board a vehicle are used to generate a synthesized image.

BACKGROUND

Systems exist that use onboard cameras to monitor the surroundings of a vehicle as an auxiliary means for checking safety when a vehicle is driven. For example, in the monitoring system disclosed in Kokai Patent Application No. 2002-19556, plural onboard cameras are arranged on the periphery of the vehicle, and the images captured by the onboard cameras are reshaped and synthesized to generate an image that shows the state of a vehicle's surroundings viewed from above the vehicle. The image obtained is displayed on a monitor.

SUMMARY

Embodiments of an image processing system and method are taught herein. One example of an image processing system so disclosed has respective image pickup parts and respective viewpoint conversion parts configured to perform viewpoint conversion of original images captured by the respective image pickup parts to generate converted images. The image processing system also includes a display device controllable to display the converted images.

BRIEF DESCRIPTION OF THE DRAWINGS

The description herein makes reference to the accompanying drawings wherein like reference numerals refer to like parts throughout the several views, and wherein:

FIGS. 4A-4D (collectively, FIG. 4) illustrate an example of normal-view images captured by the image pickup parts of the 1st-4th image pickup devices wherein FIG. 4A shows the normal-view image taken by the first image pickup device; FIG. 4B shows the normal-view image taken by the second image pickup device; FIG. 4C shows the normal-view image taken by the third image pickup device; and FIG. 4D shows the normal-view image taken by the fourth image pickup device;

DETAILED DESCRIPTION OF EMBODIMENTS OF THE INVENTION

In the monitoring system disclosed in Japanese Kokai Patent Application No. 2002-19556 described above, the original images captured by the onboard cameras are sent as original images to the image processing part as is. The original images are subjected to viewpoint conversion in the image processing part to form converted images. During viewpoint conversion, a portion of the image is enlarged so that the image resolution of the enlarged portion deteriorates, and this is undesirable.

In contrast, a scheme is proposed herein in which the pixel count of the onboard cameras is increased to perform viewpoint conversion within the onboard cameras, and after viewpoint conversion the converted images are sent to the image processing part. Depending on the specific application of the monitoring system, however, in some cases both the converted images as well as the original images should be displayed at the same time. In such cases, if only the converted images obtained by viewpoint conversion are sent to the image processing part, only the converted images after viewpoint conversion can be displayed on the display device.

Accordingly, embodiments of image processing systems and methods taught herein disclose how converted images obtained by viewpoint conversion of original images can be displayed on the display device while maintaining the high resolution of the images. Certain embodiments of the invention are now explained with reference to FIGS. 1-17.

Figure 1:
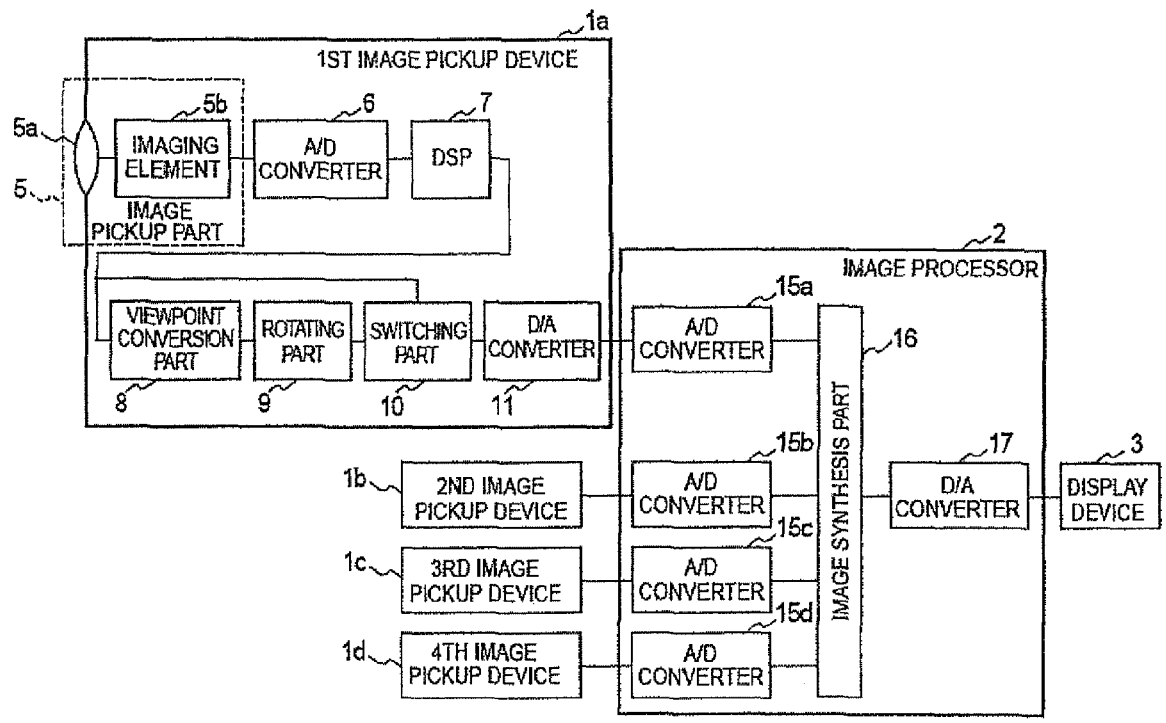
FIG. 1 is a block diagram illustrating components of an image processing system in accordance with a first embodiment of the invention.

FIG. 1 illustrates components of an image processing system of a first embodiment. The image processing system shown has 1st, 2nd, 3rd and 4th image pickup devices $1a$-$1d$, image processor 2 and display device 3.

The 1st-4th image pickup devices $1a$-$1d$ have the same internal structure, so the structure is shown only with reference to 1st image pickup device a1. Each has image pickup part 5 composed of wide-angle lens $5a$ and imaging element $5b$ and viewpoint conversion part 8 that performs viewpoint conversion of the original image taken by image pickup part 5 to generate a converted image. Here, the original images captured by image pickup part 5 are images viewed from the intrinsic viewpoint positions of 1st-4th image pickup devices $1a$-$1d$ depending on the respective mounting positions and angles of image pickup devices $1a$-$1d$. "Viewpoint conversion" refers to the processing of converting the original images to a virtual viewpoint position different from the intrinsic viewpoint positions of image pickup devices $1a$-$1d$. In the following, an example of viewpoint conversion by viewpoint conversion part 8 of original images to converted images is explained showing a view downward from a virtual viewpoint position above the vehicle. The original image will be called the "normal-view image," and the converted image will be called the "top-view image." Details of such conversions are not discussed in detail herein as a number of known techniques are possible, In 1st-4th image pickup devices $1a$-$1d$, the image data of the normal-view images captured by image pickup part 5 are converted by A/D converter 6 to digital signals, which are split into two portions via DSP (Digital Signal Processor) 7. One portion is input through viewpoint conversion part 8 and rotating part 9 to switching part 10, and the other portion bypasses viewpoint conversion part 8 and rotating part 9 and is directly input to switching part 10. Rotating part 9 performs processing according to known techniques to rotate the top-view image generated by viewpoint conversion processing in viewpoint conversion part 8 to match the orientation when the synthesized image is generated in image processor 2.

Accordingly, in 1st-4th image pickup devices $1a$-$1d$, both the normal-view image and top-view image are input to switching part 10. Then switching part 10 alternately switches between and outputs the normal-view image and the top-view image. That is, for every other frame switching part 11 switches the data transmission line to the normal-view image side and top-view image side and outputs the image data. Then D/A converter 11 converts the image data to analog signals that are output to image processor 2. In this case, when the synthesized image is generated in image processor 2, 1st-4th image pickup devices $1a$-$1d$ extract the portions necessary for the synthesized image from the top-view images generated in viewpoint conversion part 8, and the extracted image portions are output to image processor 2.

Image processor 2 has image synthesis part 16 that synthesizes the top-view images output from 1st-4th image pickup devices $1a$-$1d$ to form a synthesized image. In the following, it is assumed that image synthesis part 16 of image processor 2 combines the top-view images from 1st-4th image pickup devices $1a$-$1d$ to generate a synthesized image of the surroundings of the vehicle as viewed from a virtual viewpoint above the vehicle. This synthesized image is called a "panoramic image."

In image processor 2, the normal-view and top-view image data output from 1st-4th image pickup devices $1a$-$1d$ and input to image processor 2 are converted to digital signals by the respective A/D converters $15a$-$d$ corresponding to image pickup devices $1a$-$1d$, and the signals are input to image synthesis part 16. Image synthesis part 16 then synthesizes the top-view images from image pickup devices $1a$-$1d$ to generate the panoramic image. The image data for the panoramic image generated by image synthesis part 16 and the normal-view images from 1st-4th image pickup devices $1a$-$1d$ are converted by D/A converter 17 to analog signals, and these are output to display device 3. Display device 3 displays the normal-view images and the panoramic image based on the image data output from image processor 2.

Figure 2:
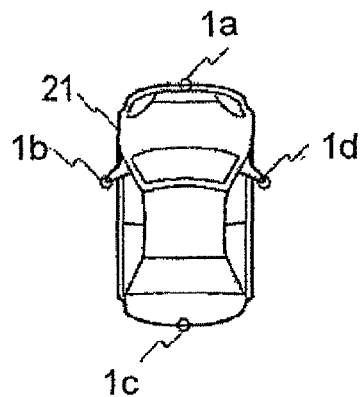
FIG. 2 is a schematic diagram illustrating an example of a configuration for installing 1st-4th image pickup devices mounted on the periphery of a vehicle.
Figure 3:
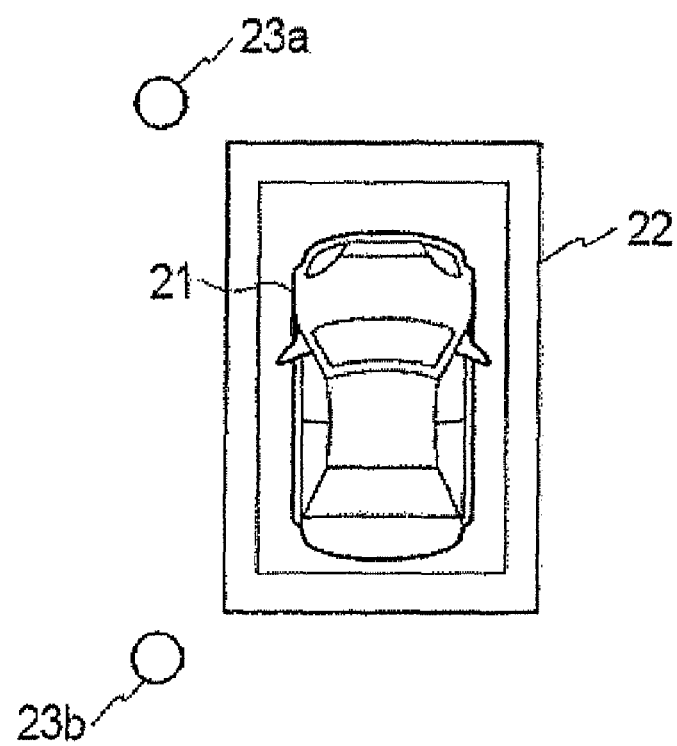
FIG. 3 is a schematic diagram illustrating the state of the vehicle surroundings wherein the vehicle surroundings are enclosed by a white line, and poles are set outside of the white line.

As shown in FIG. 2, in the image processing system of this embodiment, 1st-4th image pickup devices $1a$-$1d$ are arranged respectively in the four directions at the periphery of vehicle 21 for example. In the example here, first image pickup device $1a$ is set on the front of vehicle 21, second image pickup device $1b$ is set on the left side of vehicle 21, third image pickup device $1c$ is set on the rear of vehicle 21, and fourth image pickup device $1d$ is set on the right side of vehicle 21. As the state of the surroundings of vehicle 21 where 1st-4th image pickup devices $1a$-$1d$ are mounted as shown in FIG. 2, the area surrounding vehicle 21 is enclosed by white line 22 as shown in FIG. 3. First pole $23a$ is at a distance from the left front side on the outer side of white line 22 and second pole $23b$ is at a distance from the left rear side on the outer side of white line 22.

As shown in FIG. 4, the image pickup parts 5 of 1st-4th image pickup devices $1a$-$1d$ mounted as shown in FIG. 2 can pick up the normal-view images for the surroundings of vehicle 21 in the state shown in FIG. 3 from their respective viewpoints. For example, as shown in FIG. 4A, image pickup part 5 of first image pickup device $1a$ captures an image of the front bumper of vehicle 21, white line 22 and first pole $23a$ as a normal-view image. As shown in FIG. 4B, image pickup part 5 of second image pickup device $1b$ captures an image of the left side surface of vehicle 21 and white line 22 as a normal-view image. Also, as shown in FIG. 4C, image pickup part 5 of third image pickup device $1c$ captures an image of the rear bumper of vehicle 21, white line 22 and second pole $23b$ as a normal-view image. As shown in FIG. 4D, image pickup part 5 of fourth image pickup device $1d$ captures an image of the right side surface of vehicle 21 and white line 22 as the normal-view image.

In 1st-4th image pickup devices $1a$-$1d$, viewpoint conversion part S converts the normal-view images shown in FIG. 4 to generate top-view images that are output to image processor 2 together with the normal-view images. Then image synthesis part 16 of image processor 2 synthesizes the top-view images from 1st-4th image pickup devices $1a$-$1d$ to generate a panoramic image that is output to display device 3. As a result, as shown in FIG. 5, it is possible to display a single continuous panoramic image obtained by connecting top-view images 31-34 on display device 3.

Figure 4A:
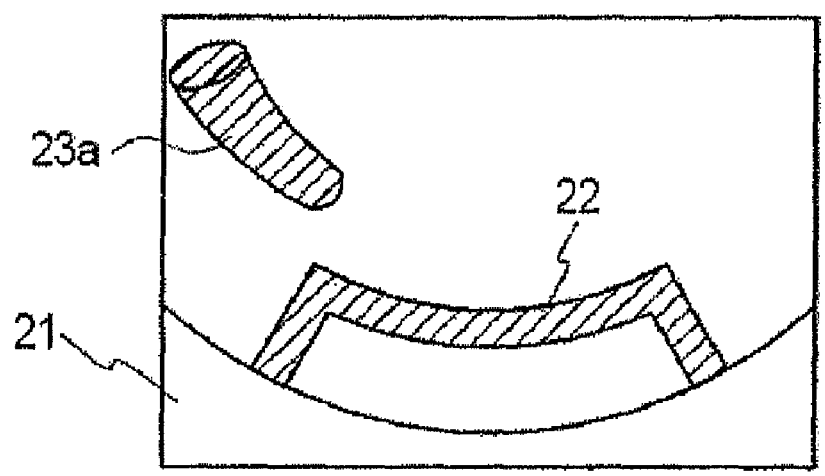
Figure 4B:
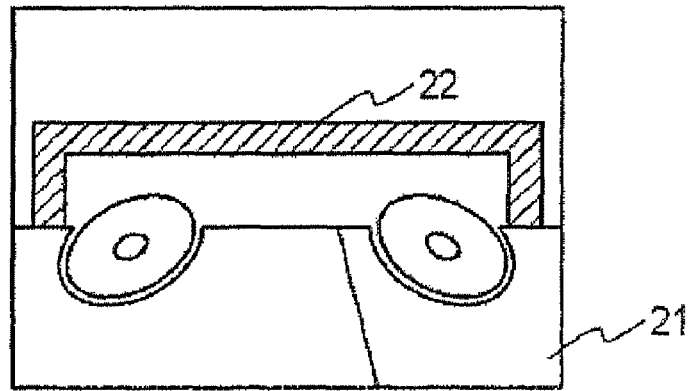
Figure 4C:
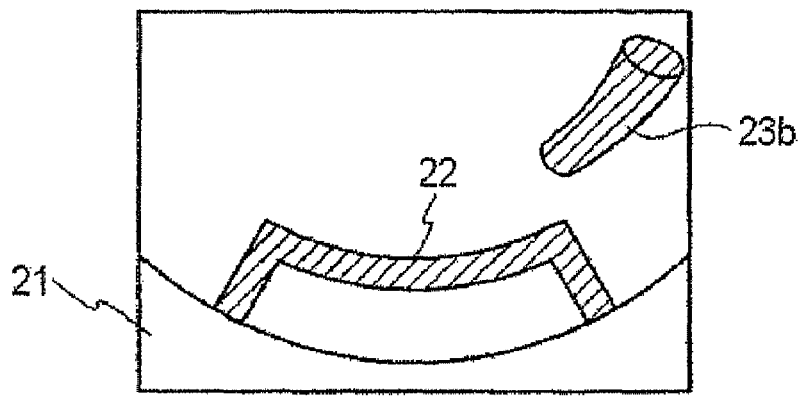
Figure 4D:
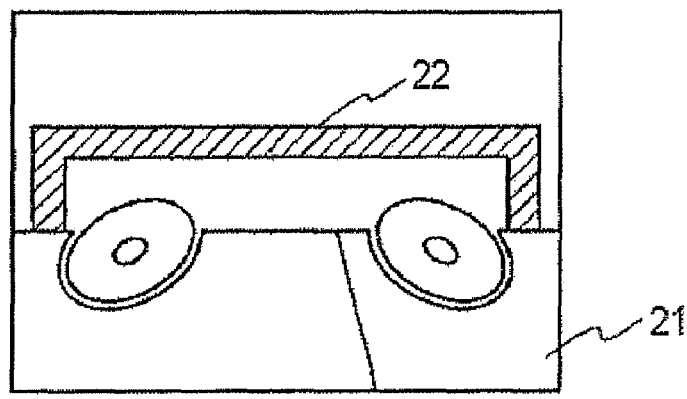
Figure 5:
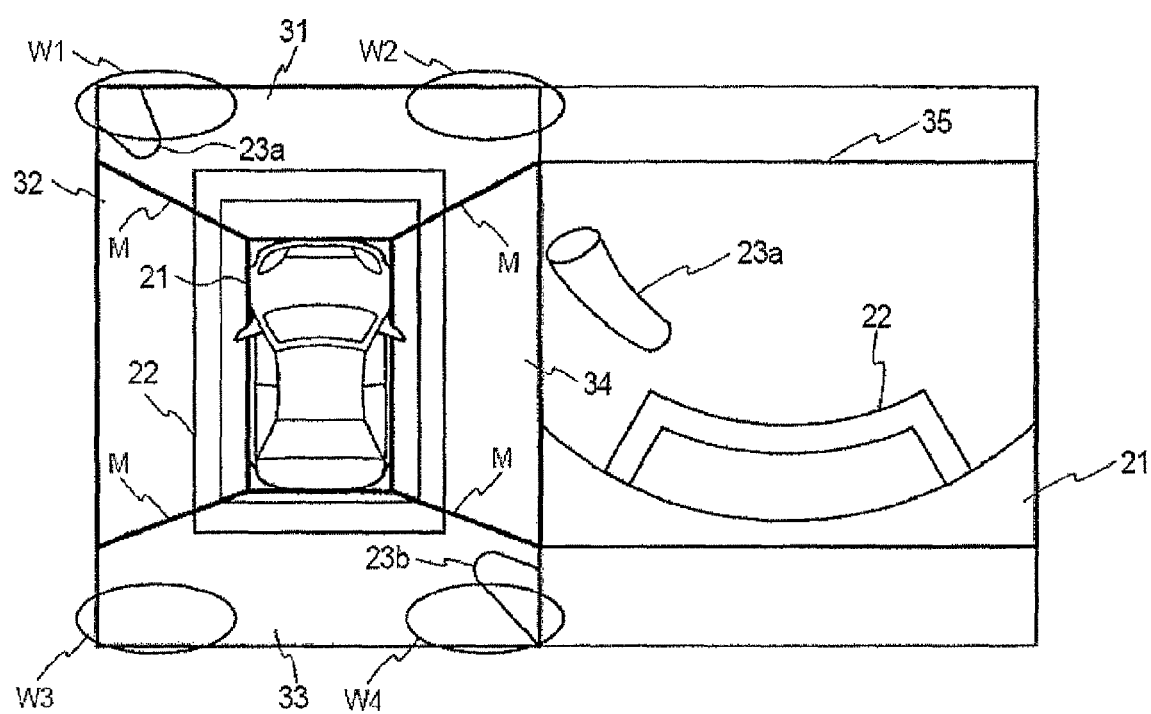
FIG. 5 is a diagram illustrating an example in which a panoramic image and normal-view image are displayed on the display device.

In the panoramic image shown as an example in FIG. 5, top-view image 31 is obtained by viewpoint conversion of the normal-view image shown in FIG. 4A taken by first image pickup device $1a$. Top-view image 32 is obtained by viewpoint conversion of the normal-view image shown in FIG. 4B taken by second image pickup device $1b$. Top-view image 33 is obtained by viewpoint conversion of the normal-view image shown in FIG. 4C taken by third image pickup device 1c. Finally, top-view image 34 is obtained by viewpoint conversion of the normal-view image shown in FIG. 4D taken by fourth image pickup device 1d. In the panoramic image, mask line M is superimposed at each joint between top-view images 31-34 to reduce the awkward appearance due to discontinuity at the joints. Techniques to generate such a panoramic image are known in the art.

As shown in FIG. 5, display device 3 can display one normal-view image 35 among those shown in FIGS. 4A-4D together with the panoramic image. In the example shown in FIG. 5, the normal-view image shown in FIG. 4A captured by first image pickup device 1a is displayed together with the panoramic image.

Figure 6:
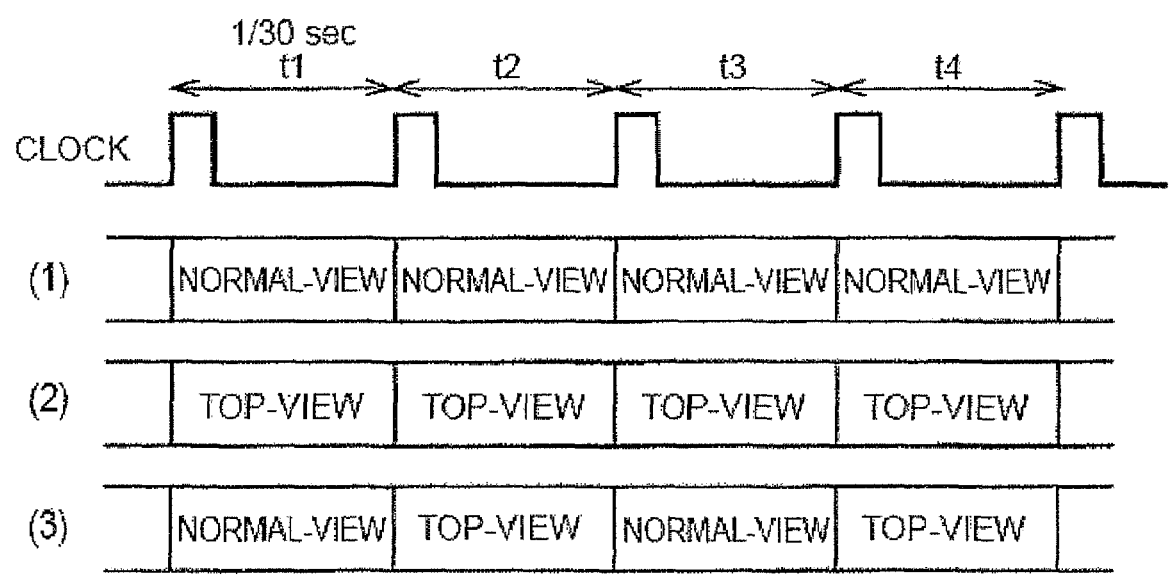
FIG. 6 is a time chart illustrating the image data switching processing performed by the switching parts of the 1st-4th image pickup devices.

FIG. 6 is a time chart illustrating the image data switching processing performed by switching parts 10 in 1st-4th image pickup devices 1a-1d. Switching parts 10 of image pickup devices 1a-1d are locked to a prescribed clock period, and alternately output normal-view images and top-view images. In FIG. 6, (1) shows the input timing of the image data directly input from DSP 7 to switching part 10, and (2) shows the input timing of the image data input from DSP 7 to switching part 10 via viewpoint conversion part 8 and rotating part 9. In this way, the normal-view image and the top-view image are input to switching part 10 in synchronization with the clock (t1, t2, . . . ) Finally, (3) shows the output timing from switching part 10. In this way, switching part 10 alternately outputs the normal-view image and top-view image in synchronization with the clock (t1, t2, . . . )

Figure 7:
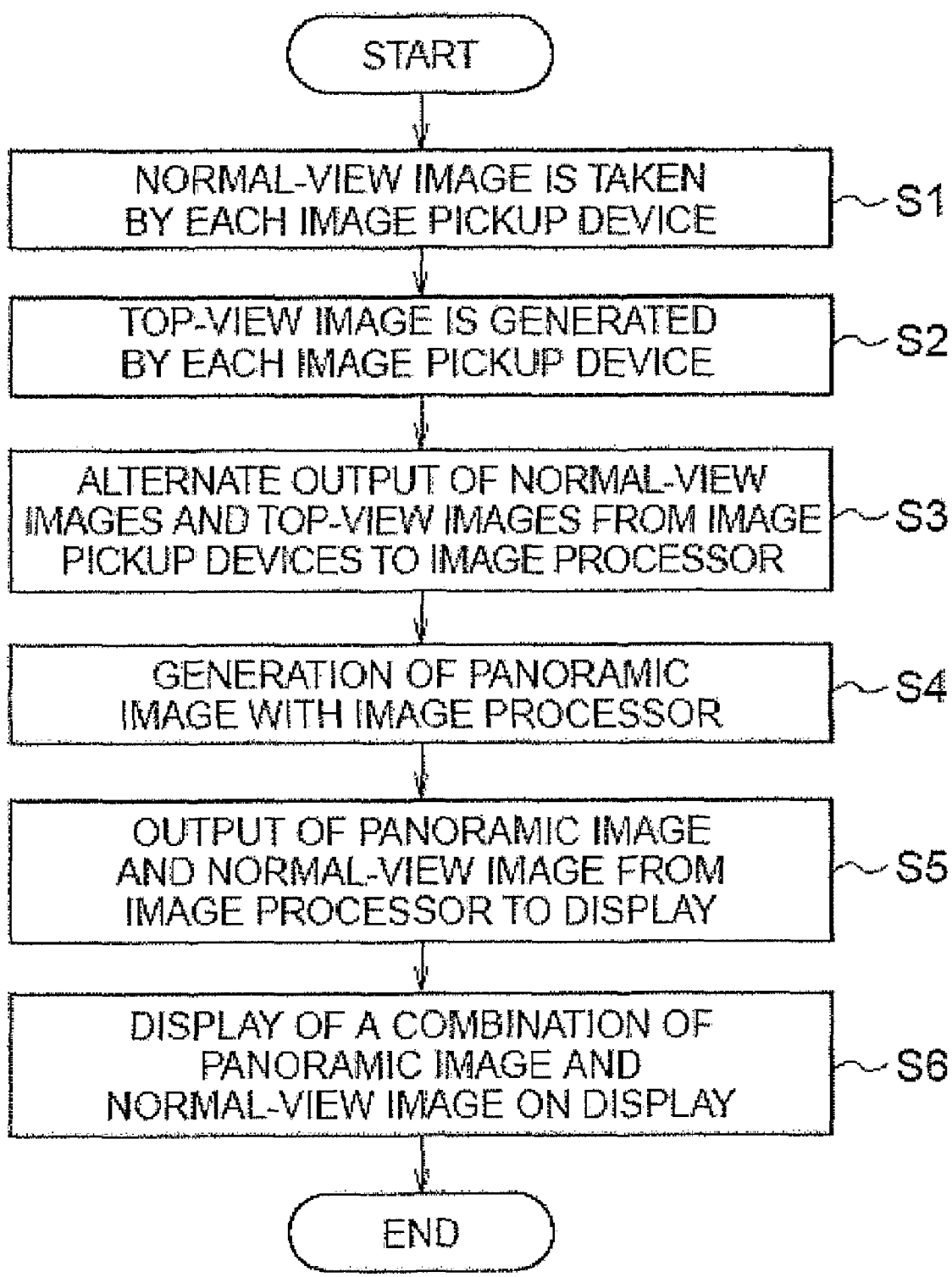
FIG. 7 is a flow chart illustrating schematically the series of operations performed to display the images shown in FIG. 5 on the display device of the image processing system according to the first embodiment.

FIG. 7 is a flow chart illustrating schematically the series of operations performed for display of the images shown in FIG. 5 on display device 3 in the image processing system in the first embodiment. In process step S1 image pickup parts 5 of 1st-4th image pickup devices 1a-1d first capture images of the surroundings of the vehicle as normal-view images. Then, in process step S2 viewpoint conversion parts 8 of 1st-4th image pickup devices 1a-1d perform viewpoint conversion of the normal-view images captured by image pickup parts 5 and generate the top-view images.

In process step S3, the normal-view images and the top-view images are switched alternately in switching parts 10 of 1st-4th image pickup devices 1a-1d, with the images being output from 1st-4th image pickup devices 1a-1d to image processor 2. Image synthesis part 16 of image processor 2 next synthesizes the top-view images from 1st-4th image pickup devices 1a-1d to generate a panoramic image in process step S4. In next process step S5, the panoramic image and the normal-view images from 1st-4th image pickup devices 1a-1d are output from image processing device 2 to display device 3. Finally, in process step S6 the panoramic image and the normal-view images are combined as shown in FIG. 5 for display on display device 3.

For the first embodiment of the invention explained above, the following operation and effects are obtained.

First, consider the case in which the image resolution of image pickup parts 5 of 1st-4th image pickup devices 1a-1d, the bandwidth of the transmission lines between 1st-4th image pickup devices 1a-1d and image processor 2, and the image resolution of display device 3 are all matched. In this case, viewpoint conversion of the normal-view images shown in FIGS. 4A-4D to top-view images 31-34 shown in FIG. 5 stretches the pixels in the enlarged portions W1-W4 shown in FIG. 5 by a factor of two or more, and the images deteriorate. This is undesirable. Here, by raising the pixel count of imaging elements 5b, the resolution of image pickup parts 5 of image pickup devices 1a-1d can be increased. Viewpoint conversion is then performed inside image pickup devices 1a-1d to generate the top-view images. As a result, it is possible to eliminate the problem of deterioration of the top-view images.

By example, when imaging element 5b has 300,000 pixels and the bandwidth of the transmission line is 300,000 pixels, the normal-view images captured by image pickup parts 5 of image pickup devices 1a-1d are each sent as 300,000 pixels to image processor 2, and viewpoint conversion is performed in image processor 2 to generate the top-view images. As a result, the enlarged portions of the images deteriorate. Here, for example, if the pixel count of imaging element 5b is increased to 1 million pixels and viewpoint conversion is performed inside image pickup devices 1a-1d, the pixel count of the top-view images after the viewpoint conversion becomes 300,000 pixels. In this situation, it is possible to send top-view images free of deterioration to image processor 2 through a 300,000-pixel transmission line.

However, in some cases it may be necessary to display not only the panoramic image obtained by joining top-view images 31-34 with each other, but also normal-view image 35 on display device 3 simultaneously, as shown in FIG. 5. In this case, if a 300,000-pixel transmission line is used to transmit the top-view images and normal-view images at the same time from image pickup devices 1a-1d to image processor 2, the resolution of the top-view and normal-view images obtained at image processor 2 becomes 150,000 pixels.

Here, switching parts 10 of image pickup devices 1a-1d alternately send the top-view images and normal-view images in synchronization with the clock periods shown in FIG. 6. As a result, the top-view and normal-view images are sent to image processor 2 while high image resolution is maintained, and the panoramic image obtained by joining the top-view images with each other can be displayed on display device 3 simultaneously with the normal-view images while a high image resolution is maintained.

In this case, only portions of the top-view images generated by viewpoint conversion of image pickup devices 1a-1d that are needed for generating the panoramic image in image processor 2 are extracted and output to image processor 2, so that the quantity of data flowing on the transmission line can be kept to a minimum.

Also, the top-view images generated by viewpoint conversion of normal-view images are subjected to rotation processing in rotating part 9 of image pickup devices 1a-1d, so that they are rotated to match the orientation required when the panoramic image is generated in image processor 2, after which they are output to image processor 2. As a result, the image processing load can be reduced in image processor 2, and image processor 2 can be simplified.

Figure 8:
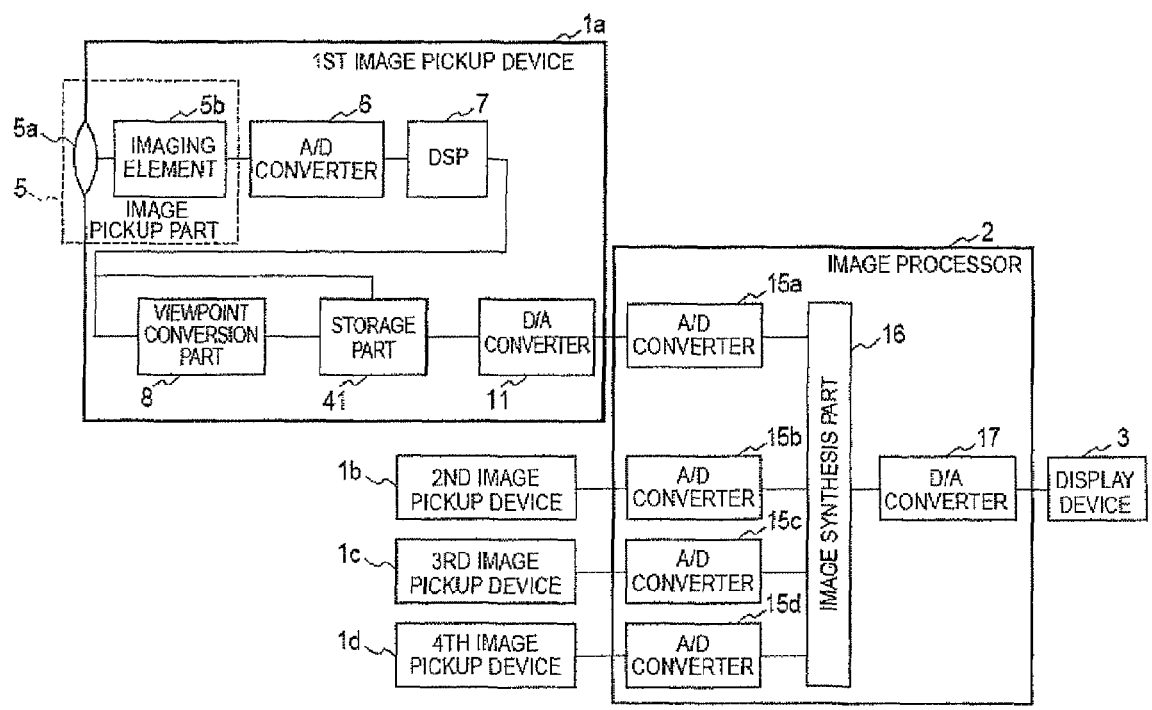
FIG. 8 is a block diagram illustrating components of an image processing system in a second embodiment of the invention.

In the following, a second embodiment of the invention is explained. FIG. 8 is a diagram illustrating components of the image processing system in the second embodiment, which differs from the first embodiment in that 1st-4th image pickup devices 1a-1d have storage parts 41 instead of switching parts 10 (see FIG. 1), and rotating part 9 is omitted. The remaining features of the image processing system of the second embodiment are the same as those in the first embodiment, so only the characteristic features of the second embodiment are explained below while the portions identical to the first embodiment are not repeated.

Each storage part 41 arranged in 1st-4th image pickup devices 1a-1d has a storage capacity of, for example, 4 frames (4 images) of image data. Each of image pickup devices 1a-1d has a write speed to read speed ratio of 1:2 relative to storage part 41. In conjunction with this ratio, image pickup devices 1a-1d use D/A converter 11 and A/D converter 6 operating at a speed double that for those used in the first embodiment.

Figure 9:
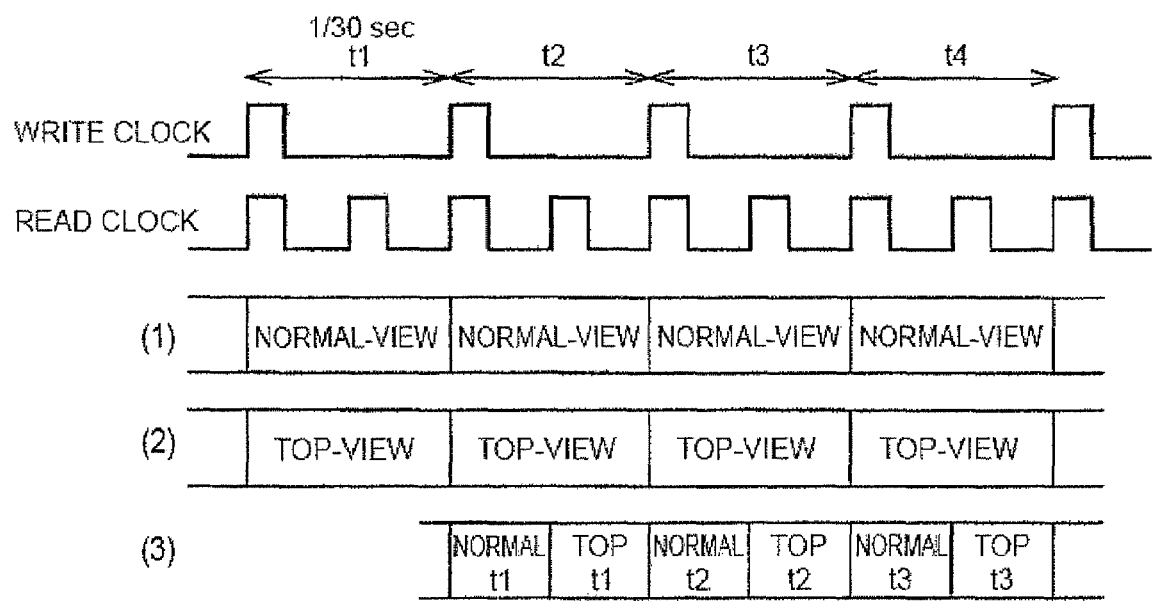
FIG. 9 is a time chart illustrating the image data read/write processing relative to the storage parts in the 1st-4th image pickup devices.

FIG. 9 is a time chart illustrating write and read processing of image data relative to storage parts 41 in 1st-4th image pickup devices 1a-1d. In FIG. 9, (1) shows the input timing for image data directly input from DSP 7 to storage part 41, and (2) shows the input timing for image data input from DSP 7 to storage part 41 via viewpoint conversion part 8. In this way, the normal-view images and top-view images are input to storage part 41 according to the same timing and locked to the write clock (t1, t2, . . . ) In addition, (3) shows the output timing from storage part 41. In this way, the normal-view images and top-view images are locked to the read clock period and output alternately from storage part 41. The read clock speed is double the write clock speed. Consequently, a normal-view image and a top-view image are each output once during each write clock period.

As explained above, in the write mode in 1st-4th image pickup devices 1a-1d of the image processing system of this second embodiment, the image data of the normal-view image and that of the top-view image are written in two frames of the 4-frame storage capacity of storage part 41 at time t1. In the read mode, on the other hand, the image data of the normal-view image and that of the top-view image are read at time t2 at a speed double the write speed. As a result, it is possible during one frame to send the normal-view image and the top-view image to the transmission line simultaneously. In the write mode at time t2, the new image data are written in the 2-frame storage region of storage part 41 not used at time t1. Because it is read at time t3, the image data do not overflow, and read/write can be performed.

In the first embodiment, as indicated by the time chart shown in FIG. 6, the top-view image is not output at times t1 and t3, and the normal-view image cannot be output at times t2 and t4. Consequently, the data quantity for each image is cut in half, and the images have frames missing from them. In the second embodiment, as shown in the time chart of FIG. 9, both the normal-view image and the top-view image can be output at any time, so that it is possible to display the images without missing frames.

In this way, each of 1st-4th image pickup devices 1a-1d of the image processing system in the second embodiment has storage part 41 with a 4-frame storage capacity, and the ratio of the write speed to the read speed relative to storage part 41 is set at 1:2. As a result, it is possible to display images on display device 3 without missing frames and without deterioration in resolution.

Figure 10:
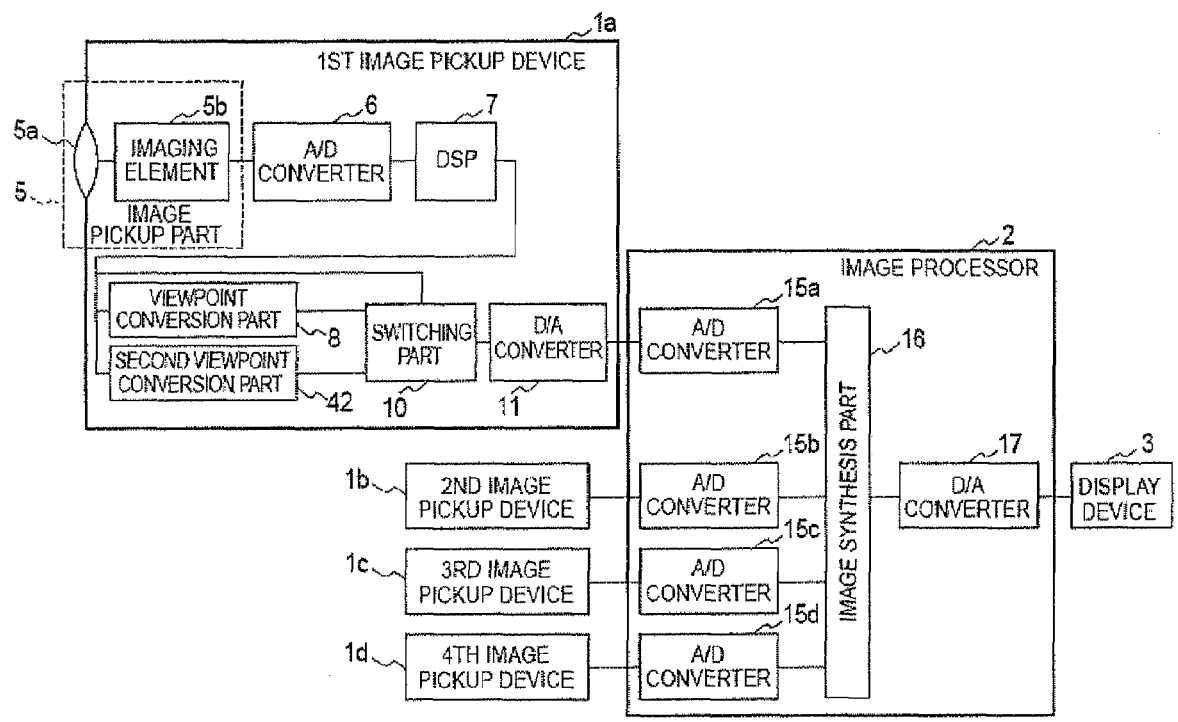
FIG. 10 is a block diagram illustrating components of an image processing system in a third embodiment of the invention.

In the following, a third embodiment of the invention is explained with reference to FIG. 10. The components of the image processing system in the third embodiment differ from the first embodiment in that 1st-4th image pickup devices 1a-1d also have respective second viewpoint conversion parts 42 in addition to viewpoint conversion parts 8, while rotating part 9 is omitted. The remaining features of the image processing system of the third embodiment are the same as those in the first embodiment. In the following, the portion of the third embodiment identical to the first embodiment is not repeated.

Second viewpoint conversion parts 42 arranged in 1st-4th image pickup devices 1a-1d perform viewpoint conversion for normal-view images captured by image pickup parts 5 to generate second converted images. A second converted image is an image whose viewpoint position is different from those of the normal-view image and top-view image. As mentioned above, various techniques are known to perform viewpoint conversion, so they are not discussed in detail herein. In the following, second viewpoint conversion part 42 is understood as a part that converts the normal-view image to generate an enlarged image as the second converted image. In the image processing system of FIG. 10, each frame switching part 10 of image pickup devices 1a-1d sequentially switches and outputs a normal-view image, a top-view image or an enlarged image.

Figure 11:
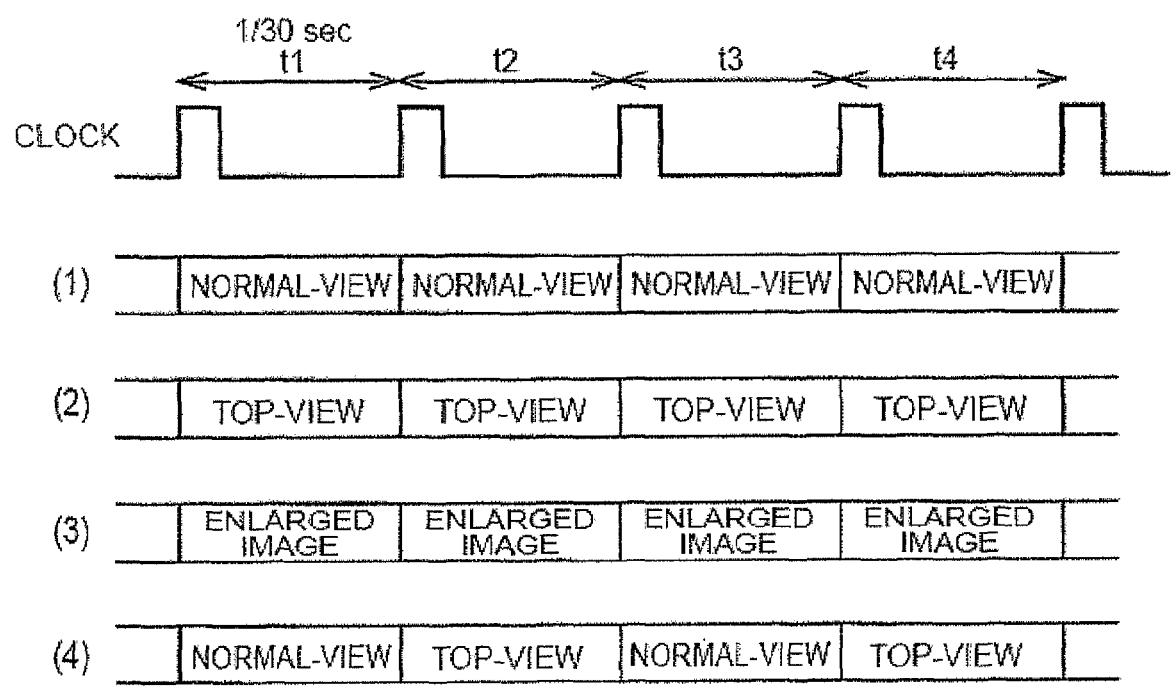
FIG. 11 is a time chart illustrating the image data switching processing performed by the switching parts of the 1st-4th image pickup devices according to the third embodiment.

FIG. 11 is a time chart illustrating the image data switching processing performed by switching parts 10 of 1st-4th image pickup devices 1a-1d. Here, switching parts 10 of image pickup devices 1a-1d are locked to the prescribed clock periods, and sequentially output the normal-view images, top-view images and enlarged images (second converted images). In FIG. 11, (1) shows the input timing for image data directly input to switching parts 10 from DSP 7, and (2) shows the input timing for image data input to switching parts 10 from DSP 7 via viewpoint conversion part 8. Also in FIG. 11, (3) shows the input timing for the image data input from DSP 7 to switching parts 10 via second viewpoint conversion part 41. In this way, the normal-view images, top-view images and the enlarged images (second converted images) are input to switching parts 10 at the same timing locked to clock (t1, t2, . . . ) The output timing from switching parts 10 is shown in (4). In this way, switching parts 10 sequentially output normal-view images, top-view images and enlarged images (second converted images) locked to the clock periods. That is, switching parts 10 sequentially output the image data for the various images locked to the clock periods. As shown, a normal-view image is output at time t, a top-view image is output at time t2, an enlarged image is output at time t3, another normal-view image is output at time t4, etc.

As explained above, 1st-4th image pickup devices 1a-1d of the image processing system in the second embodiment have second viewpoint conversion parts 42 that convert the normal-view images captured by image pickup parts 5 so as to generate second converted images, and for each frame switching parts 10 sequentially switch and output a normal-view image, a top-view image or an enlarged image (second converted image). As a result, the image processing system of the second embodiment can diversify the images displayed on display device 3, and images can be displayed on display device 3 that show in more detail the surroundings of the vehicle.

Figure 12:
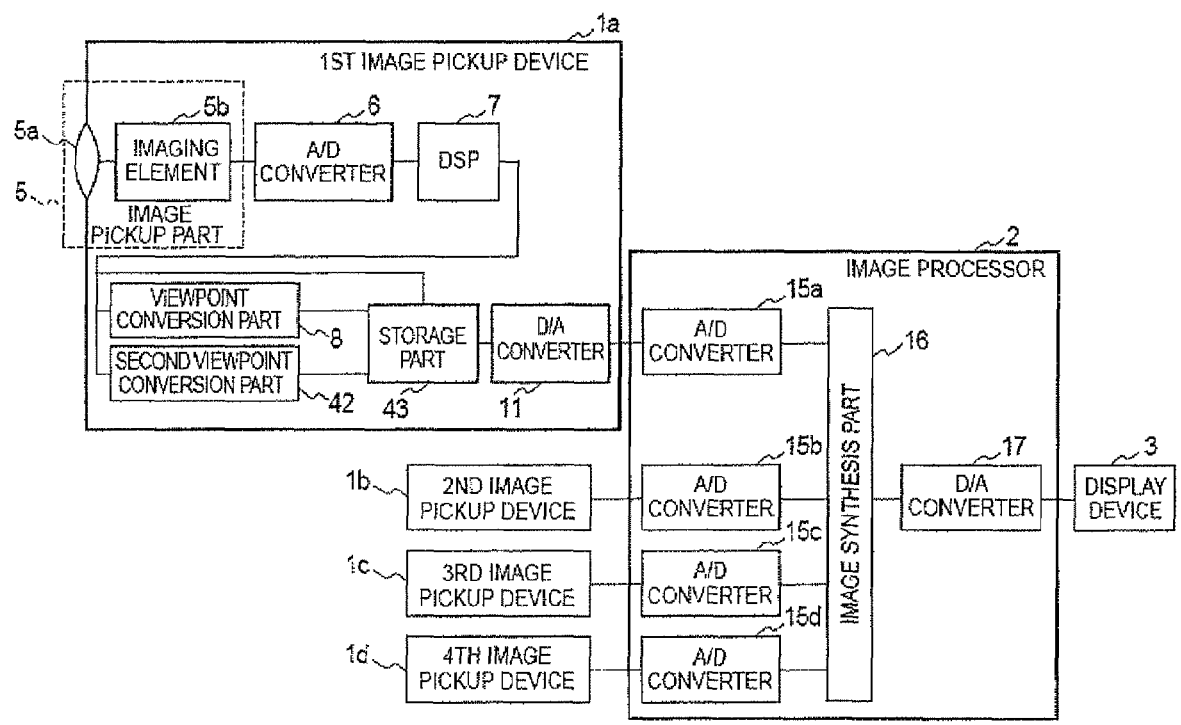
FIG. 12 is a block diagram illustrating components of an image processing system in a fourth embodiment of the invention.

In the following, a fourth embodiment of the invention is explained with reference to FIG. 12. The components of the image processing system in the fourth embodiment differ from those in the third embodiment in that 1st-4th image pickup devices 1a-1d have storage parts 43 instead of switching parts 10 (see FIG. 10). The remaining features of the image processing system of the fourth embodiment are the same. In the following, only the characteristic features of the present embodiment are explained, while the portions identical to the third embodiment are not repeated.

Storage parts 43 arranged in 1st-4th image pickup devices 1a-1d each have a 6-frame (6-image) image data storage capacity. Also, image pickup devices 1a-1d have a ratio of write speed to read speed relative to storage parts 43 of 1:3. In conjunction with this, image pickup devices 1a-1d also make use of D/A converter 11 and A/D converter 6 operating at a speed three times those used in the first embodiment and illustrated in FIG. 1.

Figure 13:
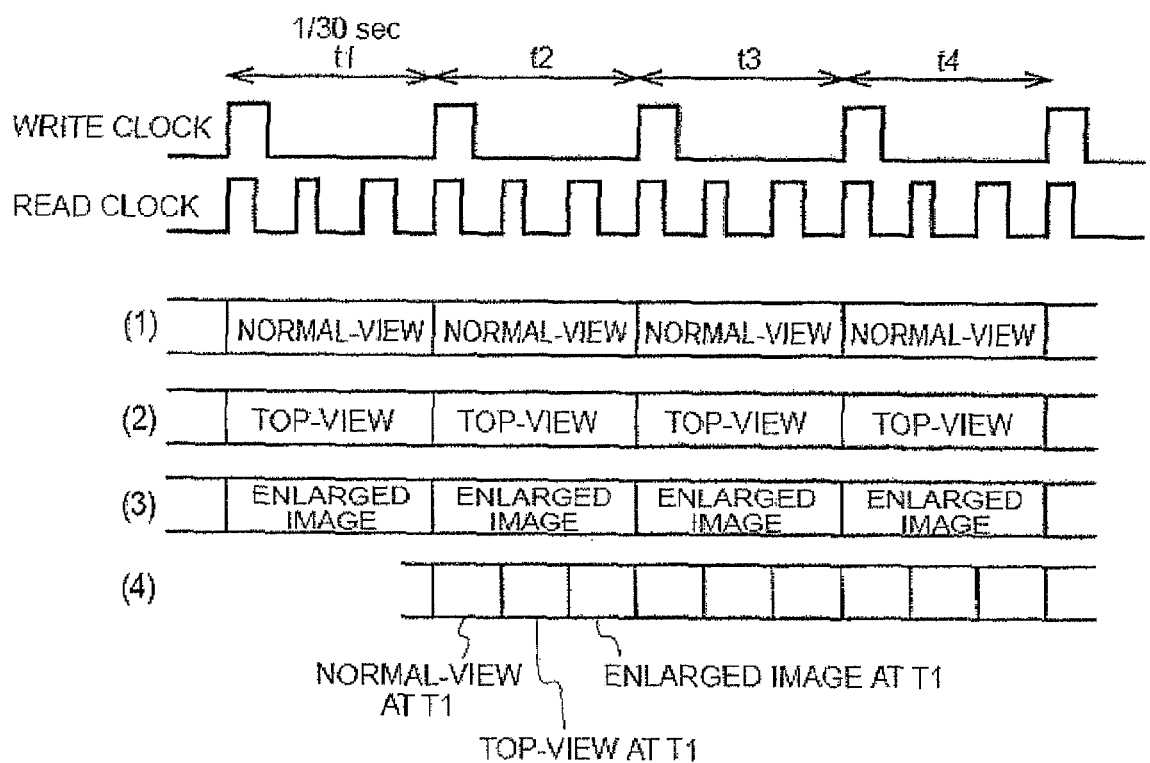
FIG. 13 is a time chart illustrating the image data write/read processing relative to the storage parts in the 1st-4th image pickup devices according to the fourth embodiment.

FIG. 13 is a time chart illustrating write/read processing of image data relative to storage parts 43 in 1st-4th image pickup devices 1a-1d. Here, (1) shows the input timing of image data input directly from DSP 7 to storage parts 43, and (2) shows the input timing of image data input from DSP 7 to storage parts 43 via viewpoint conversion parts 8. Also in FIG. 13, (3) shows the input timing of image data from DSP 7 to storage parts 43 via second viewpoint conversion parts 42. In this way, the normal-view images, top-view images and enlarged images (second converted images) are input to storage parts 43 at the same timing locked to clock (t1, . . . ) Finally, (4) shows the output timing from storage parts 43. In this way, the normal-view images, top-view images and enlarged images (second converted images) are sequentially output from storage parts 43 locked to the read clock periods. Here, the speed of the read clock is three times that of the write clock. Consequently, a normal-view image, top-view image and enlarged image (second converted image) are each output once per write clock period, As explained above, in the write mode in 1st-4th image pickup devices 1a-1d of the image processing system of the fourth embodiment, the image data of the normal-view image, the image data of the top-view image and the image data of the enlarged image are written at time t1 into three frames in storage part 41 having a storage capacity of 6 frames of image data. In the read mode, on the other hand, the image data of the normal-view image, the image data of the top-view image and the image data of the enlarged image are read at time t2 at a speed three times the write speed. As a result, during one frame the normal-view image, the top-view image and the enlarged image can be sent to the transmission line simultaneously. Also, in the write mode, new image data are written at time t2 in the 3-frame storage region of storage part 43 not used at time t1, and because the image data are read at time t3, they do not overflow. Hence, read/write can be performed.

In the third embodiment, as indicated by the time chart shown in FIG. 11, the top-view image and enlarged image cannot be output at time t1, the normal-view image and enlarged image cannot be output at time t2, and the normal-view image and top-view image cannot be output at time t3. As a result, the images have missing frames because the quantity of image data is reduced to ⅓ of what was input. According to the fourth embodiment, however, and as shown in the time chart of FIG. 13, the normal-view image, top-view image and enlarged image can be output at all times, and it is possible to display the images without missing frames.

In this way, 1st-4th image pickup devices 1a-1d of the image processing system of the fourth embodiment have storage parts 43, each having a 6-frame image data storage capacity, and the ratio of write speed to read speed relative to storage parts 43 is set at 1:3. Images can accordingly be displayed on display device 3 without deterioration in the resolution and without missing frames.

Figure 14:
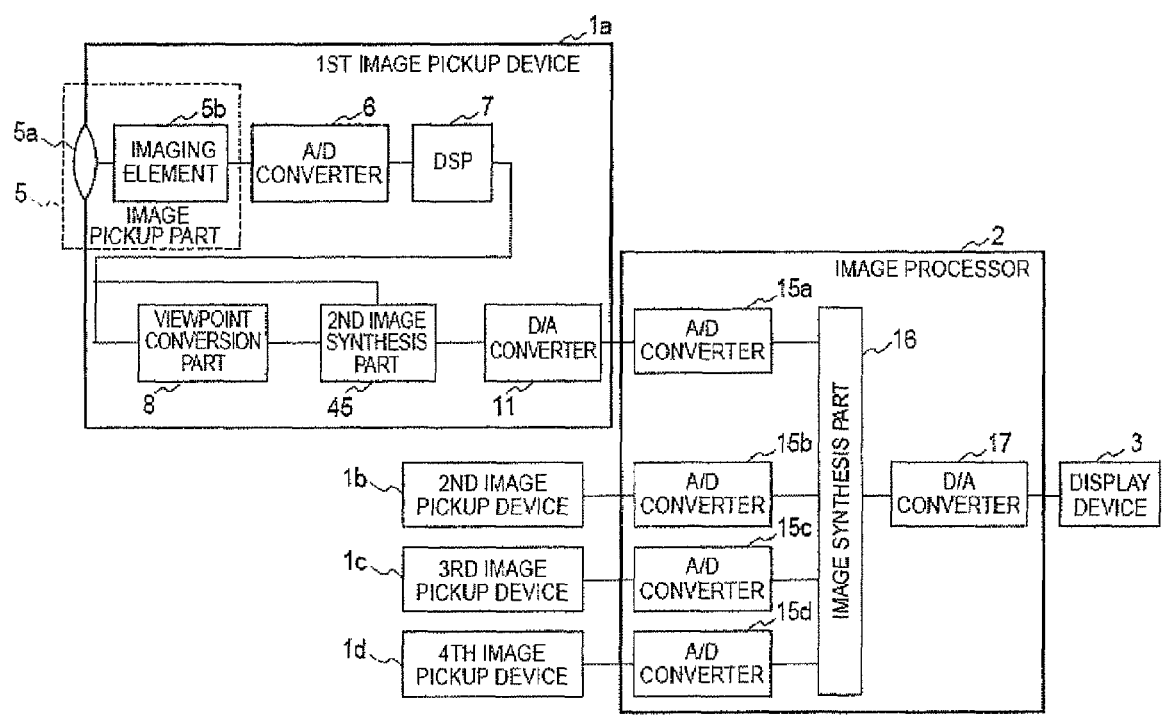
FIG. 14 is a block diagram illustrating components of an image processing system in a fifth embodiment of the invention.

In the following, a fifth embodiment of the invention is explained. FIG. 14 is a diagram illustrating components of an image processing system in the fifth embodiment. The image processing system in this embodiment differs from the first embodiment in that 1st-4th image pickup devices 1a-1d have second image synthesis parts 45 in place of switching parts 10 (see FIG. 1), and rotating parts 9 are omitted. The remaining features of the image processing system are the same. In the following, the portions of the fifth embodiment identical to the first embodiment are not repeated.

Figure 15:
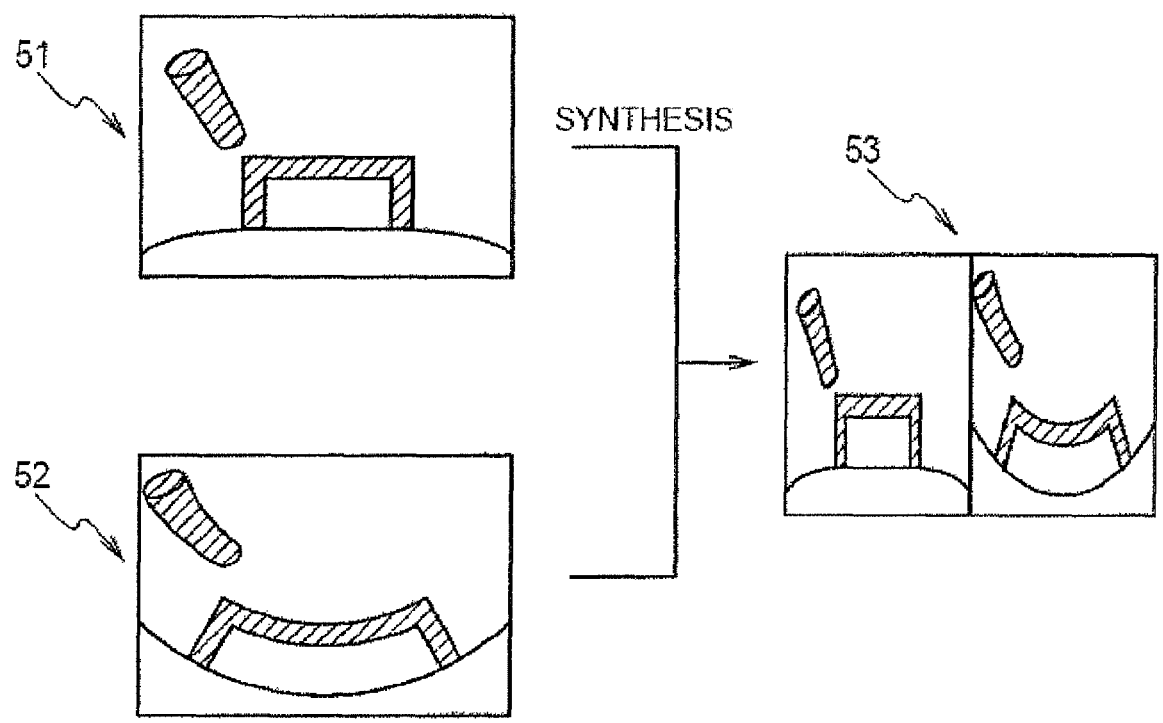
FIG. 15 is a schematic diagram illustrating the generation of a composite image by synthesizing the normal-view image and top-view image in the second image synthesis parts of the 1st-4th image pickup devices.

For example, as shown in FIG. 15, each of second image synthesis parts 45 arranged in 1st-4th image pickup devices 1a-1d synthesizes normal-view image 51 taken by image pickup part 5 and top-view image 52 generated by viewpoint conversion part 8 by joining the normal-view image 51 and the top-view image 52 to generate a composite image (second synthesized image) 53. Image pickup devices 1a-1d then output composite images 53 generated by second image synthesis parts 45 to image processor 2. Image synthesis part 16 of image processor 2 performs further processing of the composite images sent from image pickup devices 1a-1d for display on display device 3.

As explained above, 1st-4th image pickup devices 1a-1d in the image processing system of the fifth embodiment have second image synthesis parts 45 that synthesize the normal-view images captured by image pickup parts 5 and the top-view images generated by viewpoint conversion parts X to generate composite images (second synthesized images). Composite images generated in the second image synthesis parts 45 are then output to image processor 2. As a result, with the image processing system in the fifth embodiment, even when normal-view images and top-view images are displayed simultaneously on display device 3, the pixels are still not enlarged by a factor of more than two, and it is possible to display excellent images with high resolution on display device 3.

In the following, modified examples of the fifth embodiment are explained. As shown in FIG. 14, 1st-4th image pickup devices 1a-1d have second image synthesis parts 45 for generating composite images (second synthesized images) 53 shown by example in FIG. 15. However, second image synthesis parts 45 do not perform image processing to rotate, enlarge or reduce the top-view images. Consequently, for example, in order to display the panoramic image (synthesized image) on display device 3 as shown on the left side of FIG. 5, image synthesis part 16 of image processor 2 must perform processing such as rotation, enlargement or reduction of the composite images (second synthesized images) received from 1st-4th image pickup devices 1a-1d. Accordingly, the processing load for image processor 2 becomes greater.

Figure 16:
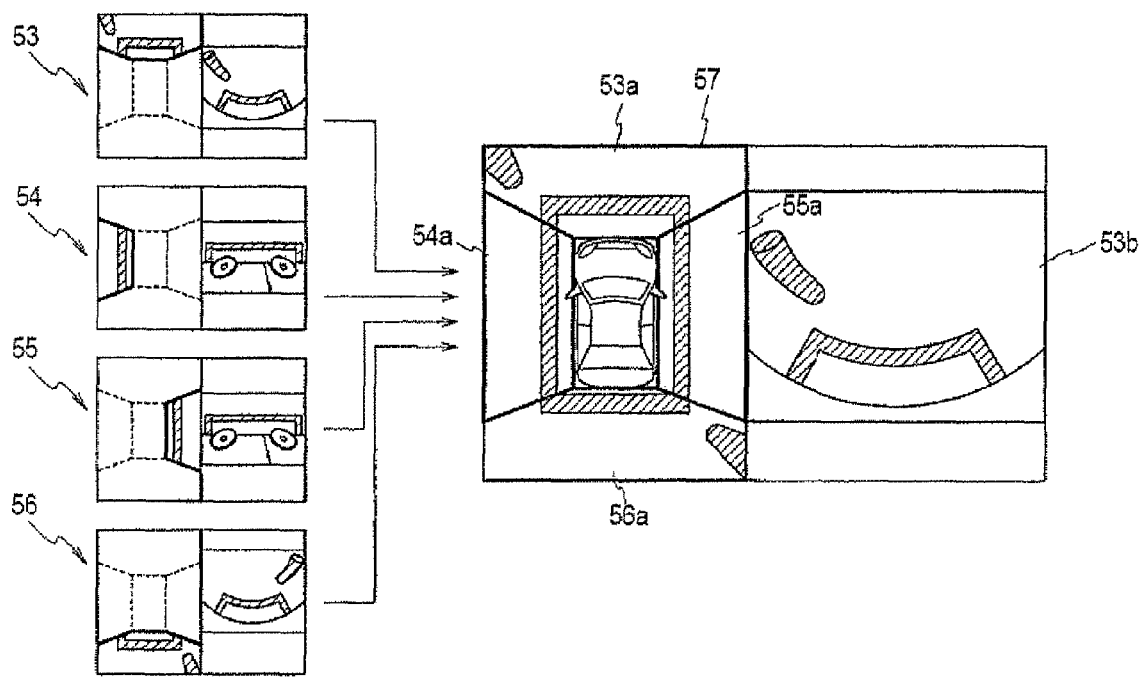
FIG. 16 is a schematic diagram illustrating the generation of the image for final display on the display device from the composite image obtained by processing so that the image portion of the top-view image matches the final display form.

Taking this problem into consideration, the top-view image portion of the composite image generated by second image synthesis parts 45 is subjected inside 1st-4th image pickup devices 1a-1d to processing into the panoramic image display form finally displayed on display device 3 before being output to image processor 2 as shown in FIG. 16. More specifically, the 1st-4th image pickup devices 1a-1d have a function for rotating and shrinking the top-view image portion on the left side of composite images 53-56 generated by second image synthesis parts 45 such that they match image portions 53a-56a corresponding to panoramic image 57. As a result, the image processing functionality needed in image processor 2 is significantly reduced, and it is possible to simplify it to only the synthesis function of fetching the necessary image portion from the composite images from 1st-4th image pickup devices 1a-1d. This makes it possible for the processing load in image processor 2 to be significantly reduced, while it is possible to display panoramic image 57 on display device 3 as shown in FIG. 16. It is also possible to display normal-view image 53b captured by image pickup part 5 of first image pickup device 1a together with panoramic image 57 on display device 3. Also, the cost of providing an image processing function to image pickup devices 1a-1d can be cut because it pertains only to the simple functions of computing image enlargement/reduction, translation, rotation, etc. As a result, it is possible to cut the overall cost of the system compared with the case when the same function is provided in image processor 2.

Figure 17:
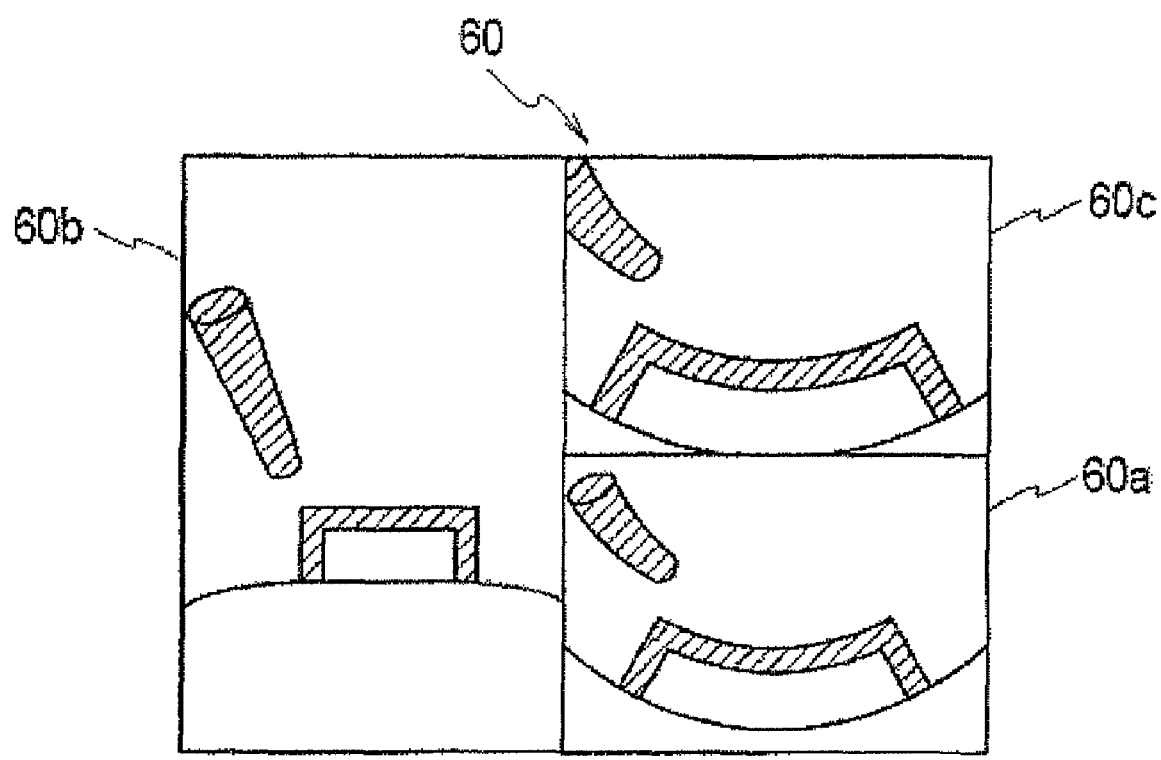
FIG. 17 is a diagram illustrating an example of the composite image formed by synthesis of the normal-view image, top-view image and enlarged image by the second image synthesis parts of the 1st-4th image pickup devices.

The second image synthesis parts 45 of 1st-4th image pickup devices 1a-1d shown in FIG. 14 synthesized normal-view images and top-view images to form composite images 53 shown by the example in FIG. 15. However, the following scheme can also be adopted. As explained for the third and fourth embodiments, image pickup devices 1a-1d can have second viewpoint conversion parts 42 (see FIGS. 10 and 12) used to generate enlarged images (second converted images), with these being synthesized together with the normal-view images and top-view images in second image synthesis parts 45. As shown in FIG. 17, normal-view images 60a, top-view images 60b and enlarged images 60c can be joined to form composite images 60. In this case, it is possible to significantly reduce the processing load in image processor 2, and at the same time, just as in the third and fourth embodiments, it is possible to realize diversification of the configuration of images that can be displayed on display device 3 so that images can be displayed on display device 3 that show the vehicle surroundings in more detail, In the embodiments discussed, each of the image pickup devices 1a-1d includes an onboard microprocessor or integrated controller (a microcomputer) including central processing unit (CPU), input and output ports (I/O), random access memory (RAM), keep alive memory (KAM), a common data bus and read only memory (ROM) as an electronic storage medium for executable programs, etc. The viewpoint conversion part 8, rotating part 9, switching part 10, the second viewpoint conversion part 42 and second image synthesis part 46 represent functional components of those executable programs. The image processor 2 also represents such a microprocessor or integrated controller such that the image processing part 16 represents a functional component of the executable programs of the image processor 2. Of course, some or all of the components or parts shown can be performed by discrete components instead of executable programs. For example, the A/D converter 15a-15d and the D/A converter 17 can be separate components from the image processor 2 and controlled thereby, like the A/D converters 6 and D/A converters 11 of the image pickup devices 1a-1d controlled by the onboard processor/controller. The storage part 41 and the storage part 43 can comprise separate portions of the memory of the onboard processor/controller of the image pickup devices 1a-1d or can be separate memory accessible by thereby, Also, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An image processing system, comprising:
   plural image pickup devices, each including an image pickup part configured to capture an original image and each including an onboard processor, each of the onboard processors including a viewpoint conversion part configured to perform viewpoint conversion for the original image to generate a converted image, wherein the converted image has a virtual viewpoint position different from an intrinsic viewpoint position of the image pickup part as shown in the original image;
   an image processor coupled to each of the onboard processors and including an image synthesis part configured to synthesize converted images output from the onboard processors of the plural image pickup devices to generate a synthesized image; and
   a display device controllable by the image processor to selectively display the synthesized image and at least one original image output from the plural image pickup devices.

2. The system according to claim 1 wherein the plural image pickup devices are configured to output less than an entirety of the converted images generated by respective viewpoint conversion parts to the image processor.

3. The system according to claim 1 wherein each of the onboard processors further comprises:
   a rotating part configured to rotate the converted image generated by the viewpoint conversion part to match an orientation in the synthesized image.

4. The system according to claim 1 wherein each of the onboard processors is configured to alternately output the original image and a converted image to the image processor.

5. The system according to claim 4 wherein each of the plural image pickup devices further comprises:
   a storage part with at least a 4-image storage capacity; and wherein a ratio of write speed to read speed relative to the storage part is 1:2.

6. The system according to claim 1 wherein each of the onboard processors further comprises:
   a second viewpoint conversion part, different from the first viewpoint conversion part and configured to perform viewpoint conversion of the original image to generate a second converted image, wherein the second converted image has a virtual viewpoint position different from the intrinsic viewpoint position of the image pickup part as shown in the original image; and wherein each of the onboard processors is configured to sequentially output the original image, the converted image and the second converted image to the image processor.

7. The system according to claim 6 wherein each of the image pickup devices further comprises:
   a storage part with a 6-image storage capacity; and wherein a ratio of write speed to read speed relative to the storage part is 1:3.

8. An image processing system, comprising:
   plural image pickup devices, each including an image pickup part configured to capture an original image and a viewpoint conversion part configured to perform viewpoint conversion for the original image to generate a converted image, wherein the converted image has a virtual viewpoint position different from an intrinsic viewpoint position of the image pickup part as shown in the original image;
   an image processor operable to synthesize converted images output from the plural image pickup devices to generate a synthesized image; and
   a display device controllable to selectively display the synthesized image and at least one original image output from the plural image pickup devices; wherein each of the image pickup devices further comprises:
   an image synthesis part configured to synthesize the original image and the converted image to generate a second synthesized image.

9. An image processing system, comprising:
   image pickup devices having respective image pickup parts configured to capture original images having intrinsic viewpoint positions based on respective positions of the image pickup devices and having respective onboard processors, each onboard processor having a respective viewpoint conversion part configured to perform viewpoint conversion of the original images to generate converted images having virtual viewpoint positions different from the intrinsic viewpoint positions of the original images;
   an image processor configured to receive the original images and the converted images from each of the onboard processors; and
   a display device controllable by the image processor to display the original images and the converted images.

10. An image processing system, comprising:
plural image pickup devices, each including means for capturing an original image and each including onboard processing means for processing the original image, each onboard processing means including viewpoint conversion means for performing viewpoint conversion for the original image to generate a converted image, wherein the converted image has a virtual viewpoint position different from an intrinsic viewpoint position of the capture means as shown in the original image;
image processing means coupled to each onboard processing means for synthesizing converted images output from each onboard processing means of the plural image pickup devices to generate a synthesized image; and
display means for selectively displaying the synthesized image and at least one original image output from the plural image pickup devices responsive to the image processing means.

11. The system according to claim 10 wherein each of the onboard processing means further comprises:
means for rotating the converted image generated by the viewpoint conversion means to match an orientation in the synthesized image.

12. The system according to claim 10 wherein each of the onboard processing means further comprises:
second viewpoint conversion means, different from the first viewpoint conversion means, for performing viewpoint conversion of the original image to generate a second converted image, wherein the second converted image has a virtual viewpoint position different from the intrinsic viewpoint position of the capture means as shown in the original image; and
means for sequentially outputting respective original images, converted images and second converted images to the image processing means.

13. The system according to claim 12 wherein the sequentially outputting means comprises:
means for storing six images; and wherein a ratio of write speed to read speed relative to the storing means is 1:3.

14. An image processing method, comprising:
capturing original images using respective image pickup devices, each image pickup device including a respective onboard processor;
subjecting the original images to viewpoint conversion to form respective converted images in the respective image pickup devices using the respective onboard processors;
outputting the original images and the respective converted images from the respective onboard processors of the respective image pickup devices to an image processor;
synthesizing the respective converted images output from the respective image pickup devices to form a synthesized image using the image processor; and
selectively displaying the synthesized image and at least one of the original images.

15. The method according to claim 14, further comprising:
rotating at least one of the respective converted images using at least one of the respective image pickup devices to match an orientation in the synthesized image.

16. The method according to claim 14 wherein outputting the original images and the respective converted images from the respective onboard processors of the respective image pickup devices to the image processor further comprises:
alternately outputting the original images and the respective converted images.

17. The method according to claim 16, further comprising:
alternately storing the original images and the respective converted images in a storage part with at least a 4-image storage capacity; and wherein a ratio of write speed to read speed relative to the storage part is 1:2.

18. The method according to claim 16, further comprising:
performing viewpoint conversion of the original images to generate respective second converted images different from the respective converted images using the respective onboard processors; and wherein outputting the original images and the respective converted images from the respective onboard processors of the respective image pickup devices to the image processor further comprises:
sequentially outputting the original images, the respective converted images and the respective second converted images to the image processor.

19. An image processing method, comprising:
capturing a first original image using an image pickup part of a first image pickup device, the first image pickup device including an onboard processor having a viewpoint conversion part;
subjecting the first original image to viewpoint conversion using the viewpoint conversion part of the first image pickup device to produce a first visible image having a virtual viewpoint position different from an intrinsic viewpoint position of the first image pickup device;
capturing a second original image using an image pickup part of a second image pickup device, the second image pickup device including an onboard processor having a viewpoint conversion part;
subjecting the second original image to viewpoint conversion using the viewpoint conversion part of the second image pickup device to produce a second visible image having a virtual viewpoint position different from an intrinsic viewpoint position of the second image pickup device;
transmitting the first and second visible images from each of the onboard processors to a common image processor; and
displaying the first and the second visible images on a display device.

* * * * *

UNITED STATES PATENT AND TRADEMARK OFFICE
CERTIFICATE OF CORRECTION

| | | |
|---|---|---|
| PATENT NO. | : 8,134,595 B2 | Page 1 of 1 |
| APPLICATION NO. | : 11/755368 | |
| DATED | : March 13, 2012 | |
| INVENTOR(S) | : Takano | |

It is certified that error appears in the above-identified patent and that said Letters Patent is hereby corrected as shown below:

On the title page, at Item (30), please insert, --Foreign Application Priority Data – June 02, 2006 (JP) 2006-154486--.

Signed and Sealed this
First Day of May, 2012

David J. Kappos
*Director of the United States Patent and Trademark Office*